US009584194B2

(12) United States Patent
Zhang (10) Patent No.: US 9,584,194 B2
(45) Date of Patent: Feb. 28, 2017

(54) METHOD AND APPARATUS FOR CANCELLING INTERFERENCE (75) Inventor: Xiaobo Zhang, Shenzhen (CN)

(73) Assignee: ZTE Corporation (CN)

( * ) Notice: Subject to any disclaimer, the term of this patent is extended or adjusted under 35 U.S.C. 154(b) by 212 days.

(21) Appl. No.: 14/383,691

(22) PCT Filed: Jun. 25, 2012

(86) PCT No.: PCT/CN2012/077440
§ 371 (c)(1),
(2), (4) Date: Sep. 8, 2014

(87) PCT Pub. No.: WO2013/131339
PCT Pub. Date: Sep. 12, 2013

(65) Prior Publication Data
US 2015/0016293 A1    Jan. 15, 2015

(30) Foreign Application Priority Data
Mar. 9, 2012  (CN) .......................... 2012 1 0061520

(51) Int. Cl.
H04B 7/02     (2006.01)
H04W 72/04    (2009.01)

(52) U.S. Cl.
CPC ........ *H04B 7/024* (2013.01); *H04W 72/0426* (2013.01)

(58) Field of Classification Search
CPC .......................... H04B 7/024; H04W 72/0426
USPC ....... 370/241, 252, 310, 328, 338, 351, 428, 370/464, 465, 468, 470, 474
See application file for complete search history.

(56) References Cited

U.S. PATENT DOCUMENTS

2009/0059854 A1    3/2009  Nishio et al.
2011/0176464 A1*   7/2011  Warner .................. H04B 1/713
                                              370/311

(Continued)

FOREIGN PATENT DOCUMENTS

CN    102025411    4/2011
CN    102137499    7/2011

(Continued)

OTHER PUBLICATIONS

International Search Report for PCT/CN2012/077440, English translation attached to original, Both completed by the Chinese Patent Office on Dec. 4, 2012, 5 Pages.

*Primary Examiner* — Obaidul Huq
(74) *Attorney, Agent, or Firm* — Brooks Kushman P.C.

(57) ABSTRACT

A method and apparatus are disclosed for canceling interference. The method includes: composing a cooperative group with multiple adjacent evolved NodeB (eNB); each eNB in the cooperative group sending frame structure configuration information to each eNB other than itself in the cooperative group every other frame structure change cycle; and each eNB in the cooperative group configuring a frame structure to be used in a next frame structure change cycle according to the received frame structure configuration information. With introducing 10 ms-dynamic frame structure switching, this method and apparatus can cancel the mutual interference of uplink and downlink, especially the mutual interference of uplink and downlink between the eNBs at the system side.

17 Claims, 2 Drawing Sheets (56) References Cited

U.S. PATENT DOCUMENTS

2012/0302155 A1* 11/2012 Marsolais .............. H04K 1/003
 455/1
2013/0136028 A1* 5/2013 Gan ...................... H04W 24/02
 370/252

FOREIGN PATENT DOCUMENTS

| CN | 102196580 | 9/2011 |
|---|---|---|
| KR | 100982730 | 9/2010 |

* cited by examiner

METHOD AND APPARATUS FOR CANCELLING INTERFERENCE

CROSS-REFERENCE TO RELATED APPLICATION

This application is the U.S. national phase of PCT Appln. No. PCT/CN2012/077440 filed Jun. 25, 2012 which claims priority to Chinese Application No. 201210061520.4 filed Mar. 9, 2012, the disclosures of which are incorporated in their entirety by reference herein.

TECHNICAL FIELD

The present document relates to LTE-advance time division duplex (TDD) communication systems, and more particularly, to a method and apparatus for canceling interference.

BACKGROUND OF THE RELATED ART

In the LTE and LTE-A standards, the TDD system frame consists of ten subframes. 3GPP supports a total of seven kinds of frame structures, and Table 1 shows the uplink and downlink frame structures in the TDD system.

TABLE 1

| Uplink and downlink structure serial number | Downlink-to-Uplink switching point cycle | subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Currently, the system information SIB-I is used in the 3GPP standard to notify the UE of the frame structure configured by the current serving cell. According to the existing standard, the minimum change cycle of the SIB information is 640 ms. The pre-research project "Dynamic TDD frame structure" formally approved in 3GPP RAN54 (December 2011) Plenary Session makes allocating the frame structures in the TDD system more dynamically possible. Shortening the change cycle of the frame structures in the TDD system can take full advantage of the TDD characteristics to better support the transmission of the asymmetric traffic.

At present, the uplink frame structure and downlink frame structure commonly used among the evolved NodeBs (eNB) are the same to avoid interference between the uplink and downlink of the eNB, however, since the information interaction between the eNBs takes a relatively long time, if the 10 ms-dynamic frame structure switch is applied, since there is not enough time for the eNBs to perform information interaction, it will bring the problem of the mutual interference of uplink and downlink between the eNBs.

SUMMARY OF THE INVENTION

To solve the technical problem, the embodiment of the present document provides a method and apparatus for canceling interference, to cancel the interference between uplink and downlink transmissions.

To solve the abovementioned technical problem, a method for canceling interference in accordance with an embodiment of the present document comprises:

composing a cooperative group with a plurality of adjacent evolved NodeBs (eNB);

the eNB in the cooperative group sending frame structure configuration information to each eNB other than itself in the cooperative group every other frame structure change cycle;

the eNB in the cooperative group configuring a frame structure to be used in a next frame structure change cycle according to the received frame structure configuration information.

Alternatively, the frame structure configuration information is system capacity information, the eNB in the cooperative group sends frame structure configuration information to each eNB other than itself in the cooperative group every other frame structure change cycle, comprises:

each eNB in the cooperative group sending a system capacity $C_0^k \sim C_{L-1}^k$ when applying each one of L (L>1) candidate frame structures to every eNB other than itself in the cooperative group every other frame structure change cycle, wherein, k is a serial number of the eNB in the cooperative group.

Alternatively, the eNB in the cooperative group configures a frame structure to be used in a next frame structure change cycle according to the received frame structure configuration information, comprises:

after each eNB in the cooperative group receives the system capacity information sent by each eNB other than itself in the cooperative group, calculating a total cooperative capacity $C_l$ of each candidate frame structure:

$$C_l = \sum_{k=0}^{K-1} C_l^k,$$

wherein l is a serial number of the candidate frame structure, and a candidate frame structure corresponding to a maximum total cooperative capacity is configured as the frame structure to be used in the next frame structure change cycle.

Optionally, $$C_l^k = \sum_{s=0}^{S} m_k^{k,s} + \sum_{p=0}^{P} r_{l_m}^{k,p},$$

wherein $m_k^{k,s}$ is a capacity when a macrocell s in the eNB whose serial number is k uses a frame structure l in the next frame structure change cycle, $r_{l_m}^{k,p}$ is a capacity when a microcell p in the eNB whose serial number is k uses a frame structure $l_m$ in the next frame structure change cycle, and the frame structure $l_m$ used by the microcell p is a frame structure which is selected by the microcell according to performance of the microcell itself and is different from the frame structure l.

Alternatively, $$r_{l_m}^{k,p} = \sum_{t=0}^{T_d^r} r_{l_m}^{k,p}(t)_d + \sum_{t=0}^{T_u^r} r_{l_m}^{k,p}(t)_u,$$

wherein $T_d^r$ and $T_u^r$ are respectively numbers of downlink subframes and uplink subframes of the microcell in the next frame structure change cycle, $r_{l_m}^{k,p}(t)_d = e_d^r \cdot 0.001 \cdot F$, wherein, $e_d^r$ is an average spectral efficiency of the downlink transmission of the subframes having the same transmission direction in the microcell and a macrocell to which the microcell belongs, F is a system bandwidth, $$r_{l_m}^{k,p}(t)_u = e_d^r \cdot 0.001 \cdot F \cdot \frac{I_u^r}{I_u^r + \sum_{l=0}^{M} OCI_d^{l,m}},$$

wherein $I_u^r$ is an average interference level of the uplink transmission of the subframes having the same transmission direction in the microcell and a macrocell to which the microcell belongs, $OCI_d^{i,m}$ represents an interference of a downlink signal from the macrocell in the eNB whose serial number is i on uplink reception of the microcell.

Alternatively, $$m_l^{k,s} = \sum_{t=0}^{T_d^m} m_l^{k,s}(t)_d + \sum_{t=0}^{T_u^m} m_l^{k,s}(t)_u,$$

wherein $T_d^m$ and $T_u^m$ are respectively numbers of downlink subframes and uplink subframes of the macrocell in the next frame structure change cycle, $m_l^{k,s}(t)_d = e_d^m \cdot 0.001 \cdot F$, wherein, $e_d^m$ is an average spectral efficiency of the downlink transmission of the subframes having the same transmission direction in the macrocell and a subordinate microcell of the macrocell, $$m_l^{k,s}(t)_u = e_d^m \cdot 0.001 \cdot F \cdot \frac{I_u^m}{I_u^m + OCI_d^{k,r}},$$

wherein, $I_u^m$ is an average interference level of the uplink transmission of the subframes having the same transmission direction in the macrocell and a subordinate microcell of the macrocell, and $OCI_d^{i,r}$ represents an interference of a downlink signal from the microcell in the eNB whose serial number is i on uplink reception of the macrocell.

Optionally, the eNB comprises macrocells and microcells, when transmitting on the downlink of the macrocell and receiving on the uplink of the microcell, the method further comprises:

the macrocell sending data that are sent to a subordinate user equipment of the macrocell and a scheduling result of the user equipment to the microcell;

according to the data of the user equipment and the scheduling result, the microcell estimating a channel from the macrocell to the microcell and an interference of the macrocell on the microcell;

the microcell subtracting the interference of the macrocell from a received uplink signal.

Alternatively, when receiving on the uplink of the macrocell and sending on the downlink of the microcell, the method further comprises:

the microcell sending the scheduling result of a subordinate user equipment of the microcell to the macrocell;

the macrocell estimating a channel from the macrocell to the microcell and an interference of the microcell on the macrocell according to the scheduling result of the user equipment;

the macrocell subtracting the interference of the microcell from a received uplink signal.

Alternatively, $$r_{l_m}^{k,p} = \sum_{t=0}^{T_d^r} r_{l_m}^{k,p}(t)_d + \sum_{t=0}^{T_u^r} r_{l_m}^{k,p}(t)_u,$$

wherein $T_d^r$ and $T_u^r$ are respectively the numbers of downlink subframes and uplink subframes of the microcell in the next frame structure change cycle, $r_{l_m}^{k,p}(t)_d = e_d^r \cdot 0.001 \cdot F$, wherein, $e_d^r$ is the average spectral efficiency of the downlink transmission of the subframes having the same transmission direction in the microcell and a macrocell to which the microcell belongs, F is the system bandwidth, and $$r_l^{k,p}(t)_u = e_d^r \cdot 0.001 \cdot F \cdot \frac{I_u^r}{I_u^r + \sum_{\substack{l=0 \\ l \neq k}}^{M} OCI_d^{l,m}},$$

wherein, $I_u^r$ is the average interference level of the uplink transmission of the subframes having the same transmission direction in the microcell and a macrocell to which the microcell belongs, $OCI_d^{i,m}$ represents the interference of a downlink signal from the macrocell in the eNB whose serial number is i on the uplink reception of the microcell.

Alternatively, $$m_l^{k,s} = \sum_{t=0}^{T_d^m} m_l^{k,s}(t)_d + \sum_{t=0}^{T_u^m} m_l^{k,s}(t)_u,$$

wherein $T_d^m$ and $T_u^m$ are respectively the numbers of downlink subframes and uplink subframes of the macrocell in the next frame structure change cycle, $m_l^{k,s}(t)_d = e_d^m \cdot 0.001 \cdot F$, wherein, $e_d^m$ is the average spectral efficiency of the downlink transmission of the subframes having the same transmission direction in the macrocell and a subordinate microcell of the macrocell, and $m_l^{k,s}(t)_u = e_d^m \cdot 0.001 \cdot F$.

An apparatus for canceling interference in accordance with an embodiment of the present document, comprising: a frame structure configuration information transceiving unit and a frame structure configuring unit, wherein:

the frame structure configuration information transceiving unit is configured to: send frame structure configuration information to each evolved NodeB (eNB) other than the local eNB in a cooperative group every other frame structure change cycle, and receive the frame structure configuration information sent by the eNB in the cooperative group;

the frame structure configuring unit is configured to: configure a frame structure to be used in a next frame structure change cycle according to the frame structure configuration information received by the frame structure configuration information transceiving unit;

wherein, the cooperative group is composed of a plurality of adjacent eNBs.

Alternatively, the frame structure configuration information is the system capacity information;

the frame structure configuration information transceiving unit is configured to, send the system capacity $C_0^k \sim C_{L-1}^k$ when applying each one of L (L>1) candidate frame structures to each eNB other than the local eNB in the collaborative group every other frame structure change cycle, wherein, k is a serial number of the eNB in the collaborative group;

the frame structure configuring unit is configured to, after the frame structure configuration information transceiving unit receives the system capacity information sent by each eNB other than the local eNB in the cooperative group, calculate a total cooperative capacity $C_l$ of each candidate frame structure, $$C_l = \sum_{k=0}^{K-1} C_l^k,$$

wherein l is a serial number of the candidate frame structure, and configure a candidate frame structure corresponding to a maximum total cooperative capacity as the frame structure to be used in the next frame structure change cycle.

Alternatively, $$C_l^k = \sum_{s=0}^{S} m_l^{k,s} + \sum_{p=0}^{P} r_{l_m}^{k,p},$$

wherein $m_l^{k,s}$ is a capacity when a macrocell s in the eNB whose serial number is k uses the frame structure l in the next frame structure change cycle, $r_{l_m}^{k,p}$ is a capacity when a microcell p in the eNB whose serial number is k uses the frame structure $l_m$ in the next frame structure change cycle, and the frame structure $l_m$ used by the microcell is a frame structure different from the frame structure l and selected by the microcell according to performance of the microcell itself.

Alternatively, $$r_{l_m}^{k,p} = \sum_{t=0}^{T_d^r} r_{l_m}^{k,p}(t)_d + \sum_{t=0}^{T_u^r} r_{l_m}^{k,p}(t)_u,$$

wherein $T_d^r$ and $T_u^r$ are respectively numbers of downlink subframes and uplink subframes of the microcell in a next frame structure change cycle, $r_{l_m}^{k,p}(t)_d = e_d^r \cdot 0.001 \cdot F$, wherein, $e_d^r$ is an average spectral efficiency of the downlink transmission of the subframes having the same transmission direction in the microcell and a macrocell to which the microcell belongs, F is a system bandwidth, $$r_{l_m}^{k,p}(t)_u = e_d^r \cdot 0.001 \cdot F \cdot \frac{I_u^r}{I_u^r + \sum_{\substack{i=0 \\ i \neq k}} OCI_d^{i,m}},$$

wherein, $I_u^r$ is an average interference level of the uplink transmission of the subframes having the same transmission direction in the microcell and a macrocell to which the microcell belongs, $OCI_d^{i,m}$ represents the interference of a downlink signal from the macrocell in the eNB whose serial number is i on uplink reception of the microcell.

$$m_l^{k,s} = \sum_{t=0}^{T_d^m} m_l^{k,s}(t)_d + \sum_{t=0}^{T_u^m} m_l^{k,s}(t)_u,$$

wherein $T_d^m$ and $T_u^m$ are respectively numbers of downlink subframes and uplink subframes of the macrocell in the next frame structure change cycle, $m_l^{k,s}(t)_d = e_d^m \cdot 0.001 \cdot F$, wherein, $e_d^m$ is an average spectral efficiency of the downlink transmission of the subframes having the same transmission direction in the macrocell and a subordinate microcell of the macrocell, $$m_l^{k,s}(t)_u = e_d^m \cdot 0.001 \cdot F \cdot \frac{I_u^m}{I_u^m + OCI_d^{k,r}},$$

wherein, $I_u^m$ is an average interference level of the uplink transmission of the subframes having the same transmission direction in the macrocell and a subordinate microcell of the macrocell, $OCI_d^{i,r}$ represents the interference of a downlink signal from the microcell in the eNB whose serial number is i on uplink reception of the macrocell.

Alternatively, the abovementioned apparatus further comprises: a macrocell unit and a microcell unit, wherein:

the macrocell unit is configured to, when transmitting on the downlink, send data which are sent to a subordinate user equipment of the macrocell and a scheduling result of the user equipment to the microcell unit;

the microcell unit is configured to, when receiving on the uplink, according to the data of the user equipment and the scheduling result, estimate a channel from the macrocell unit to the microcell unit and an interference of the macrocell unit on the microcell unit, and subtract the interference of the macrocell unit from a received uplink signal.

Alternatively, the microcell unit is further configured to, when transmitting on the downlink, send the scheduling result of a subordinate user equipment to the macrocell unit;

the macrocell unit is further configured to, estimate a channel from the macrocell unit to the microcell unit and an interference of the microcell unit on the macrocell unit according to the scheduling result of the user equipment, and subtract the interference of the microcell unit from a received uplink signal.

Alternatively, $$r_{l_m}^{k,p} = \sum_{t=0}^{T_d^r} r_{l_m}^{k,p}(t)_d + \sum_{t=0}^{T_u^r} r_{l_m}^{k,p}(t)_u,$$

wherein $T_d^r$ and $T_u^r$ are respectively the numbers of downlink subframes and uplink subframes of the microcell in the next frame structure change cycle, $r_{l_m}^{k,p}(t)_d = e_d^r \cdot 0.001 \cdot F$, wherein, $e_d^r$ is the average spectral efficiency of the downlink transmission of the subframes having the same transmission direction in the microcell and a macrocell to which the microcell belongs, F is the system bandwidth, $$r_{l_m}^{k,p}(t)_u = e_d^r \cdot 0.001 \cdot F \cdot \frac{I_u^r}{I_u^r + \sum_{\substack{i=0 \\ i \neq k}}^{M} OCI_d^{i,m}},$$

wherein, $I_u^r$ is the average interference level of uplink transmission of the subframes having the same transmission direction in the microcell and a macrocell to which the microcell belongs, $OCI_d^{i,m}$ represents the interference of a downlink signal from the macrocell in the eNB whose serial number is i on the uplink reception of the microcell.

$$m_l^{k,s} = \sum_{t=0}^{T_d^m} m_l^{k,s}(t)_d + \sum_{t=0}^{T_u^m} m_l^{k,s}(t)_u,$$

wherein $T_d^m$ and $T_u^m$ are respectively the numbers of downlink subframes and uplink subframes of the macrocell in the next frame structure change cycle, $m_l^{k,s}(t)_d = e_d^m \cdot 0.001 \cdot F$, wherein, $e_d^m$ is the average spectral efficiency of the downlink transmission of the subframes having the same transmission direction in the macrocell and a subordinate microcell of the macrocell, $m_l^{k,s}(t)_u = e_d^m \cdot 0.001 \cdot F$.

In summary, the embodiments of the present document can cancel the mutual interference of the uplink and downlink, particularly the mutual interference of the uplink and downlink between the eNBs at the system side when introducing the 10 ms-dynamic frame structure switching.

PREFERRED EMBODIMENTS OF THE INVENTION

In the present embodiment, with composing a cooperative group with the adjacent evolved NodeBs (eNB), frame structure configuration information is transmitted between the eNBs in the cooperative group, and the eNB in the cooperative group determines a frame structure to be used in the next frame structure change cycle according to the received frame structure configuration information, and the interference between the system nodes is cancelled through the cooperative frame structure configuration scheme, moreover, the data of the user equipment and the scheduling result are exchanged between the macrocell and the microcell in the eNB, the channel and the interference are estimated, thereby canceling the interference in the eNBs, so as to reduce the uplink and downlink interference to achieve the maximum performance gain.

In the existing heterogeneous cellular network architecture, the data transmission delays between different system nodes are different, which will be divided into two cases to describe in the following:

Case One:

When the data transmission delay between the system nodes is relatively large, one typical scenario is such as the X2 interface between the eNBs, the following frame structure configuration scheme can be used to cancel the interference between the eNBs, comprising:

Composing a cooperative group with adjacent K (K>1) eNBs, the eNB in the cooperative group sends the frame structure configuration information to each eNB other than itself in the cooperative group every other frame structure change cycle, the unit of the frame structure change cycle is millisecond and is determined by the delay of the interaction between the eNBs;

the eNB in the cooperative group configures a frame structure used in the next frame structure change cycle according to the received frame structure configuration information.

The frame structure configuration information comprises: system capacity information;

the eNB (k) (the eNB whose serial number is k in the cooperative group) sends the system capacity $C_0^k, C_1^k, \ldots$ to every eNB other than itself in the cooperative group when the eNB uses one of the L (L>1) candidate frame structures every other frame structure change cycle.

after each eNB in the cooperative group receives the system capacity information of other eNBs in the group, it calculates the total collaborative capacity $$C_l = \sum_{k=0}^{K-1} C_l^k$$

of each candidate frame structure, and in the next frame structure change cycle, configures according to the frame structure with the maximum total collaborative capacity.

Wherein, the physical meaning of the system capacity $C_l^k$ the predicted system capacity when the eNB (k) uses the frame structure l to transmit in the next frame structure change cycle, and l is the serial number of the candidate frame structure.

Currently, the following equation (1) may be used to calculate the eNB's system capacity $C_l^k$.

$$C_l^k = \sum_{s=0}^{S} m_l^{k,s} + \sum_{p=0}^{P} r_l^{k,p} \quad (1)$$

In the equation (1), $m_l^{k,s}$ is the predicted macrocell capacity when the macrocell s in the eNB (k) uses the frame structure l to transmit in the next frame structure change cycle, $r_l^{k,p}$ is the corresponding microcell capacity when the microcell p in the eNB (k) uses the frame structure l to transmit in the next frame structure change cycle.

Figure 1:
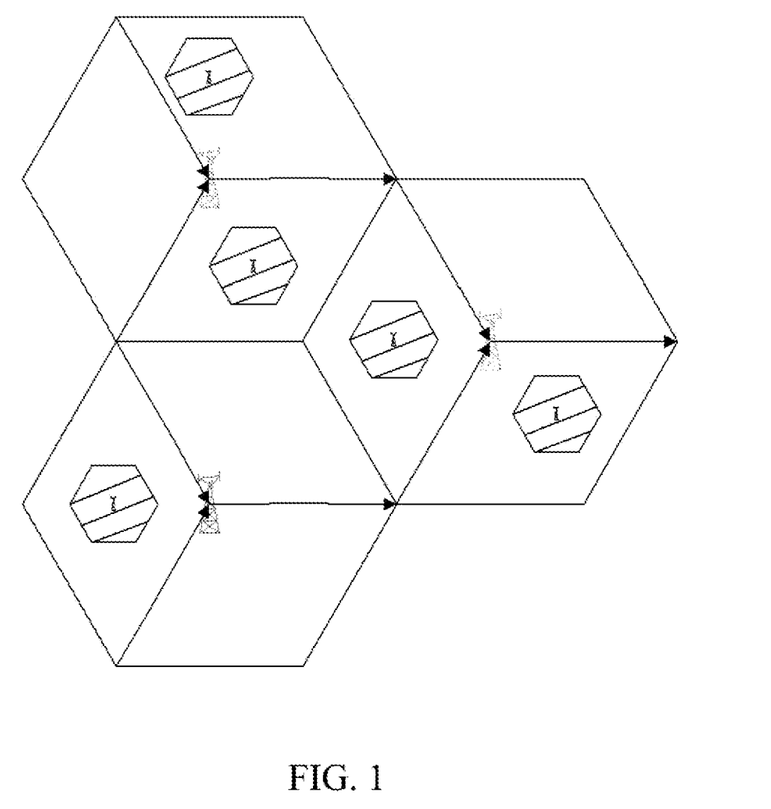
FIG. 1 is a schematic diagram of the hierarchical frame structure configuration in accordance with the present embodiment.

In the present embodiment, considering that the microcell has relatively small coverage and transmission power, the frame structure which makes the performance of the microcell optimal (i.e., may be different from the frame structure l) can be used, and the microcell and the macrocell can use different frame structure change cycles. The macrocell has relatively large transmission power, thus a frame structure selected from the candidate frame structures can be used, thus constituting a hierarchical frame structure configuration, as shown in FIG. 1, the microcell uses a frame structure different from that of the macrocell to which it belongs.

Therefore, it is to determine to use the following equation (2) to calculate $C_l^k$.

$$C_l^k = \sum_{s=0}^{S} m_l^{k,s} + \sum_{p=0}^{P} r_{l_m}^{k,p} \quad (2)$$

Wherein, $r_{l_m}^{k,p}$ is the predicted microcell capacity when the macrocell in the eNB (k) uses the frame structure l to transmit in the next frame structure change cycle, and when the microcell P uses the optimal frame structure $l_m$.

According to the service type and different scheduling/receiving algorithm, there are a variety of algorithms to calculate $m_l^{k,s}$ and $r_{l_m}^{k,p}$, in the following, the ftp traffic transmission will be taken as an example to illustrate the algorithms for calculating $m_l^{k,s}$ and $r_{l_m}^{k,p}$.

Variables are defined as follows (the upper subscripts of the variables are omitted, in the subsequent use, the following variables are added with the upper right subscripts m, r to respectively represent that the variable is for the macrocell or the microcell):

$T_d$ and $T_u$ respectively represent the numbers of downlink subframes and uplink subframes in the next frame structure change cycle;

$e_d$ is the average spectral efficiency of the downlink transmission of the subframes (such as 0/1/2/5/6 subframes) with the same transmission direction in the macrocell and the microcell within the macrocell in the past history (with a predefined statistical window 2);

$I_u$ is the average interference level of the uplink transmission of the subframes (such as 0/1/2/5/6 subframe) having the same transmission direction in the macrocell and the microcell inside the macrocell in the past history (with a predefined statistical window 3);

F is the system bandwidth;

$OCI_d^{i,m}$ represents the interference of the downlink signal from the macrocell in the eNB (i) on the uplink reception of the microcell;

$$OCI_d^{i,m} = \text{mean}(|c^{i,m}|^2),$$

wherein $c^{i,m}$ represents the received signal of the microcell at the position CRS/CSI-RS of the macrocell in the eNB (i), mean represents an average over the whole frequency band (and the predefined time window).

$OCI_d^{i,r}$ represents the interference of the downlink signal from the microcell in the eNB (i) on the uplink reception of the macrocell;

$$OCI_d^{i,r} = \text{mean}(|c^{i,r}|^2),$$

wherein, $c^{i,r}$ represents the received signal of the macrocell at the position CRS/CSI-RS of the microcell in the eNB (i), mean represents an average over the entire frequency band (and the predefined time window).

According to the above definitions, there are:

$$m_l^{k,s} = \sum_{t=0}^{T_d^m} m_l^{k,s}(t)_d + \sum_{t=0}^{T_u^m} m_l^{k,s}(t)_u \quad (3)$$

$$r_{l_m}^{k,p} = \sum_{t=0}^{T_d^r} r_{l_m}^{k,p}(t)_d + \sum_{t=0}^{T_u^r} r_{l_m}^{k,p}(t)_u \quad (4)$$

ignoring the UE-to-UE interference, for the downlink subframe t, there are:

$$m_l^{k,s}(t)_d = e_d^m \cdot 0.001 \cdot F \quad (5)$$

$$r_{l_m}^{k,p}(t)_d = e_d^r \cdot 0.001 \cdot F \quad (6)$$

ignoring the interference between the microcells and the interference of the microcell on those macrocells to which the microcell does not belong, for the uplink subframes, there are:

$$m_l^{k,s}(t)_u = e_d^m \cdot 0.001 \cdot F \cdot \frac{I_u^m}{I_u^m + OCI_d^{k,r}} \quad (7)$$

$$r_{l_m}^{k,p}(t)_u = e_d^r \cdot 0.001 \cdot F \cdot \frac{I_u^r}{I_u^r + \sum_{i=0}^{M} OCI_d^{i,m}} \quad (8)$$

For the macrocells and microcells, the OCI (Other Cell Interference) can be obtained by measuring the CSI-RS interfering cells in the conflict subframe.

The method for canceling interference in accordance with the present embodiments will be described in the following with combination of the accompanying drawings.

Figure 2:
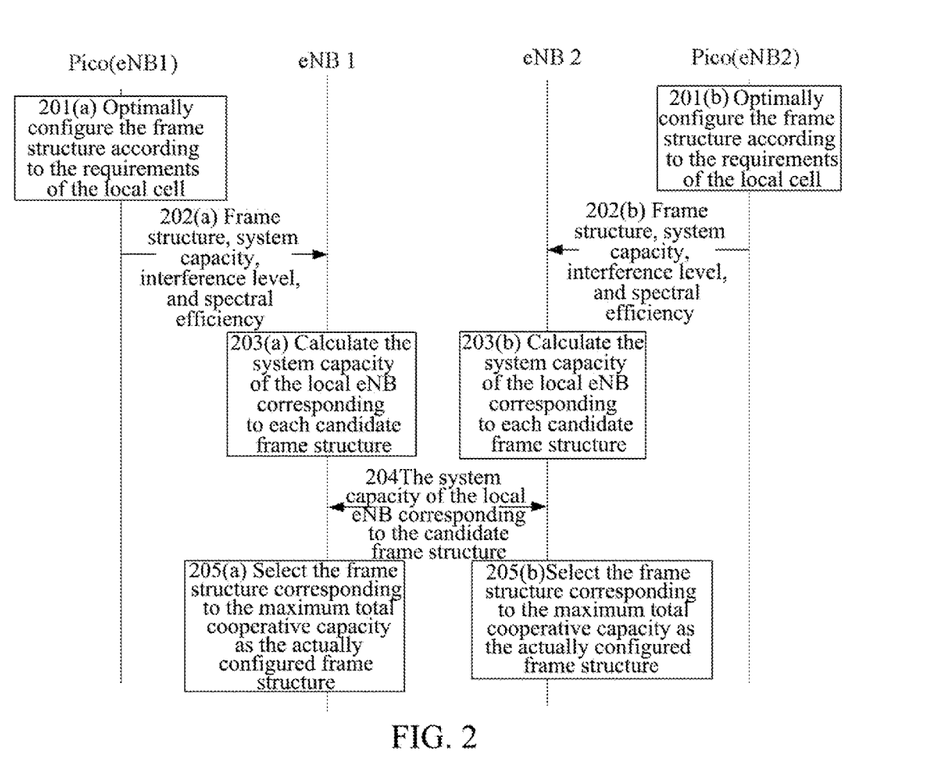
FIG. 2 is a flow chart of a method for canceling the interference between the eNBs in accordance with the present embodiment.

As shown in FIG. 2, the steps for canceling interference via the cooperative frame structure configuration scheme in this embodiment comprise:

step 201: the microcell determines the optimal frame structure of the local cell in accordance with the single-cell scheduling scheme;

The scheduling of the microcell may have a shorter cycle, such as 10 ms.

Step 202: the microcell notifies the macrocell to which it belongs of its frame structure $l_m$ in the next frame structure change cycle, the spectral efficiency $e_d^r$, and the uplink interference level $I_u^r$, for the macrocell to calculate the system capacity of the microcell;

step 203: it is to compose a cooperative group with K neighboring eNBs, for each candidate frame structure l, the system capacity in the next configuration cycle is calculated according to the equations (2) to (8);

step 204: the eNB in the collaborative group sends the system capacity information to each eNB other than itself in the cooperative group every other cycle;

the system capacity information comprises the system capacity, namely: $C_0^k \sim C_{L-1}^k$, when the eNB (k) uses each one of the L candidate frame structures.

step 205: each eNB in the cooperative group calculates the total collaborative capacity $C_l$ of each candidate frame structure, and in the next frame structure change cycle, the eNB in the cooperative group configures according to the frame structure corresponding to the maximum total collaborative capacity (max $\{C_l\}$).

The abovementioned method provides a rapid coordinative frame structure scheduling between the eNBs, and the X2 interface requires only a single information transmission to complete the frame structure configuration of the whole eNB group.

Case Two:

There is no data transmission delay between system nodes (or the delay is negligible), one typical scenario is, for example, the interactions between the macrocell and the RRH (Remote Radio Head).

For heterogeneous networks without transmission delay, the interference between the macrocell and the RRH can be cancelled by signal processing method, the following is a method for canceling the interference when transmitting on the downlink of the macrocell and receiving on the uplink of the RRH, comprising:

step a: the macrocell sends the UE's data D and the scheduling result of the UE to the RRH;

the scheduling result can comprise: the scheduled UE, the UE's resource configuration, and the MCS selection.

In order to reduce the amount of data transmitted back, the macrocell can notify the data before encoding to the RRH, so that it can encode the data by itself.

Step b: the RRH estimates the eNB->RRH channel H and the interference H·S of the macrocell signal on the RRH based on the UE's data S and the scheduling result;

Step c: the RRH subtracts the interference of the eNB from the received uplink signal Y of the local cell (Y−H·S), and demodulates the uplink data.

The following is a method for canceling the interference when the macrocell receives on the uplink and the RRH transmits on the downlink, comprising:

step A: the microcell sends the scheduling result to the eNB;

Because the data sent by the microcell to the user equipment are transmitted from the macrocell to the microcell, in this embodiment, the microcell does not need to send the data of the user equipment to the macrocell.

Step B: the eNB estimates the eNB->RRH channel and the interference of the microcell signal on the macrocell;

step C: the eNB subtracts the interference of the microcell from the received uplink signal, and demodulates the uplink data.

After using the above-mentioned scheme for canceling interference between the macrocell and the microcell, since the interference inside the eNB is cancelled, the above-mentioned equations (7) and (8) can be modified to:

$$m_l^{k,s}(t)_u = e_d^m \cdot 0.001 \cdot F \qquad (9)$$

$$r_{l_m}^{k,p}(t)_u = e_d^r \cdot 0.001 \cdot F \cdot \frac{I_u^r}{I_u^r + \sum_{\substack{i=0 \\ i \neq k}}^{M} OCI_d^{i,m}} \qquad (10)$$

Figure 3:
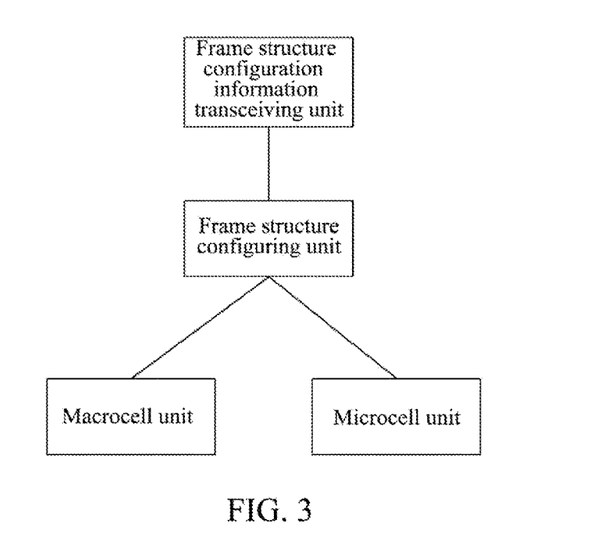
FIG. 3 is a schematic diagram of an apparatus for canceling interference in accordance with the present embodiment.

As shown in FIG. 3, the present embodiment also provides an apparatus for canceling interference, comprising: a frame structure configuration information transceiving unit and a frame structure configuring unit, wherein:

the frame structure configuration information transceiving unit is used to send the frame structure configuration information to each eNB other than itself in the cooperative group every other frame structure change cycle, and receive the frame structure configuration information sent by the eNBs in the cooperative group;

the frame structure configuring unit is used to configure the configuration information to be used in the next frame structure change cycle according to the frame structure configuration information received by the frame structure configuration information transceiving unit;

wherein, the cooperative group is composed of a plurality of adjacent eNBs.

The frame structure configuration information is the system capacity information;

the frame structure configuration information transceiving unit is specifically used to send the system capacity $C_0^k$~$C_{L-1}^k$ when using each one of L (L>1) candidate frame structures to each eNB other than itself in the cooperative group every other frame structure change cycle, wherein, k is the serial number of the eNB in the collaborative group;

the configuring unit frame structure is specifically used to, after the frame structure configuration information transceiving unit receives the system capacity information sent by each eNB other than itself in the cooperative group, calculate the total cooperative capacity $C_l$ of each candidate frame structure, $$C_l = \sum_{k=0}^{K-1} C_l^k,$$

wherein, l is the serial number of the candidate frame structure, and the candidate frame structure corresponding to the maximum total cooperative capacity is configured as the frame structure to be used in the next frame structure change cycle.

$$C_l^k = \sum_{s=0}^{S} m_l^{k,s} + \sum_{p=0}^{P} r_{l_m}^{k,p},$$

wherein, $m_l^{k,s}$ is the capacity when the macrocell s in the eNB whose serial number is k uses the frame structure l in the next frame structure change cycle, $r_{l_m}^{k,p}$ is the capacity when the microcell p in the eNB whose serial number is k uses the frame structure $l_m$ in the next frame structure change cycle, and the frame structure $l_m$ used by the microcell p is a frame structure selected by the microcell according to its own performance and different from the frame structure l.

$$r_{l_m}^{k,p} = \sum_{t=0}^{T_d^r} r_{l_m}^{k,p}(t)_d + \sum_{t=0}^{T_u^r} r_{l_m}^{k,p}(t)_u,$$

wherein $T_d^r$ and $T_u^r$ are respectively the numbers of downlink subframes and uplink subframes of the microcell in the next frame structure change cycle, $r_{l_m}^{k,p}(t)_d = e_d^r \cdot 0.001 \cdot F$, wherein, $e_d^r$ is the average spectral efficiency of the downlink transmission of the subframes having the same transmission direction in the microcell and the macrocell to which the microcell belongs, F is the system bandwidth, $$r_{l_m}^{k,p}(t)_u = e_d^r \cdot 0.001 \cdot F \cdot \frac{I_u^r}{I_u^r + \sum_{\substack{i=0 \\ i \neq k}}^{M} OCI_d^{i,m}},$$

wherein, $I_u^r$ is the average interference level of the uplink transmission of the subframes having the same transmission direction in the microcell and the macrocell to which the microcell belongs, $OCI_d^{i,m}$ represents the interference of the downlink signal from the macrocell in the eNB whose serial number is i on the uplink reception of the microcell.

$$m_l^{k,s} = \sum_{t=0}^{T_d^m} m_l^{k,s}(t)_d + \sum_{t=0}^{T_u^m} m_l^{k,s}(t)_u,$$

wherein $T_d^m$ and $T_u^m$ are respectively the numbers of downlink subframes and uplink subframes of the macrocell in the next frame structure change cycle, $m_l^{k,s}(t)_d = e_d^m \cdot 0.001 \cdot F$ wherein, $e_d^m$ is the average spectral efficiency of the downlink transmission of the subframes having the same transmission direction in the macrocell and a subordinate microcell, $$m_l^{k,s}(t)_u = e_d^m \cdot 0.001 \cdot F \cdot \frac{I_u^m}{I_u^m + OCI_d^{k,r}},$$

wherein, $I_u^m$ is the average interference level of the uplink transmission of the subframes having the same transmission direction in the macrocell and a subordinate microcell, $OCI_d^{i,r}$ represents the interference of the downlink signal from the microcell in the eNB whose serial number is i on the uplink reception of the macrocell.

The apparatus further comprises: a macrocell unit and a microcell unit, wherein:

the macrocell unit is used to, when transmitting on the downlink, send the data sent to a subordinate user equipment and the scheduling result of the user equipment to the microcell unit;

the microcell unit is used to, when receiving on the uplink, according to the data of the user equipment and the scheduling result, estimate the channel from the macrocell unit to the microcell and the interference of the macrocell unit on the microcell unit, and subtract the interference of the macrocell unit from the received uplink signal.

the microcell unit is further used to, when transmitting on the downlink, send the scheduling result of a subordinate user equipment to the macrocell unit;

the macrocell unit is further used to, estimate the channel from the macrocell unit to said the microcell unit and the interference of the microcell unit on the macrocell unit according to the scheduling result of the user equipment, and subtract the interference of the microcell unit from the received uplink signal.

Based on the interface cancellation of the macrocell unit and the microcell unit, the following equation $$r_{l_m}^{k,p} = \sum_{t=0}^{T_d^r} r_{l_m}^{k,p}(t)_d + \sum_{t=0}^{T_u^r} r_{l_m}^{k,p}(t)_u$$

can be used to calculate $r_{l_m}^{k,p}$ and $m_l^{k,s}$, wherein $T_d^r$ and $T_u^r$ are respectively the numbers of downlink subframes and uplink subframes of the microcell in the next frame structure change cycle, $r_{l_m}^{k,p}(t)_d = e_d^r \cdot 0.001 \cdot F$, wherein, $e_d^r$ is the average spectral efficiency of the downlink transmission of the subframes having the same transmission direction in the microcell and the macrocell to which the microcell belongs, F is the system bandwidth, $$r_{l_m}^{k,p}(t)_u = e_d^r \cdot 0.001 \cdot F \cdot \frac{I_u^r}{I_u^r + \sum_{\substack{i=0 \\ i \neq k}}^{M} OCI_d^{i,m}},$$

wherein, $I_u^r$ is the average interference level of the uplink transmission of the subframes having the same transmission direction in the microcell and the macrocell to which the microcell belongs, $OCI_d^{i,m}$ represents the interference of the downlink signal from the macrocell in the eNB whose serial number is i on the uplink reception of the microcell.

$$m_l^{k,s} = \sum_{t=0}^{T_d^m} m_l^{k,s}(t)_d + \sum_{t=0}^{T_u^m} m_l^{k,s}(t)_u,$$

wherein $T_d^m$ and $T_u^m$ are respectively the numbers of downlink subframes and uplink subframes of the macrocell in the next frame structure change cycle, $m_l^{k,s}(t)_d = e_d^m \cdot 0.001 \cdot F$, wherein, $e_d^m$ is the average spectral efficiency of the downlink transmission of the subframes having the same transmission direction in the macrocell and a subordinate microcell, $m_l^{k,s}(t)_u = e_d^m \cdot 0.001 \cdot F$.

Those ordinarily skilled in the art can understand that all or some of steps of the abovementioned method may be completed by the programs instructing the relevant hardware, and the programs may be stored in a computer-readable storage medium, such as read only memory, magnetic or optical disk. Optionally, all or some of the steps of the abovementioned embodiments may also be implemented by using one or more integrated circuits. Accordingly, each apparatus/module/unit in the abovementioned embodiments may be realized in the form of hardware or software function module. The present document is not limited to any specific form of hardware and software combinations.

The above description is only preferred embodiments of the present document, and is not intended to limit the protection scope of the present document. All changes, equivalent replacements and improvements within the spirit and principle of the present document should be included within the protection scope of the present document.

INDUSTRIAL APPLICABILITY

With the embodiments of the present document, the uplink and downlink interference, particularly the uplink and downlink mutual interference among the eNBs at the system side can be cancelled when introducing the 10 ms-dynamic frame structure switching.

What is claimed is:
1. A method for canceling interference, comprising:
composing a cooperative group with a plurality of adjacent evolved NodeBs (eNBs) wherein each eNB comprises a macrocell and a microcell;
the microcell notifying the macrocell of the microcell's frame structure, spectral efficiency, and uplink interference level;
the macrocell determining a system capacity of the eNB according the frame structure, the spectral efficiency, and the uplink interference level;
the eNB in the cooperative group sending the system capacity to each eNB other than itself in the cooperative group every other frame structure change cycle;
according to the system capacity, the eNB in the cooperative group configuring a frame structure to be used in a next frame structure change cycle.

2. The method of claim 1, wherein,
the eNB in the cooperative group sending the system capacity to each eNB other than itself in the cooperative group every other frame structure change cycle, comprises:
each eNB in the cooperative group sending the system capacity $C_0^k \sim C_{L-1}^k$ when applying each one of L candidate frame structures to every eNB other than itself in the cooperative group every other frame structure change cycle, wherein, k is a serial number of the eNB in the cooperative group, and L is an integer larger than 1.

3. The method of claim 2, wherein, according to the system capacity, the eNB in the cooperative group configuring the frame structure to be used in the next frame structure change cycle, comprises:

after each eNB in the cooperative group receives the system capacity sent by each eNB other than itself in the cooperative group, calculating a total cooperative capacity $C_l$ of each candidate frame structure:

$$C_l = \sum_{k=0}^{K-1} C_l^k,$$

and configuring a candidate frame structure corresponding to a maximum total cooperative capacity as the frame structure to be used in the next frame structure change cycle;

wherein, l is a serial number of the candidate frame structure, and K is a number of the eNBs in the cooperative group.

4. The method of claim 3, wherein, $$C_l^k = \sum_{s=0}^{S} m_l^{k,s} + \sum_{p=0}^{P} r_{l_m}^{k,p},$$

wherein $m_l^{k,s}$ is a capacity when a macrocell s in the eNB whose serial number is k uses the frame structure l in the next frame structure change cycle, $r_l^{k,p}$ is a capacity when a microcell p in the eNB whose serial number is k uses a frame structure $l_m$ in the next frame structure change cycle, and the frame structure $l_m$ used by the microcell p is a frame structure which is selected by the microcell according to performance of the microcell itself and is different from the frame structure l.

5. The method of claim 4, wherein, $$r_{l_m}^{k,p} = \sum_{t=0}^{T_d^r} r_{l_m}^{k,p}(t)_d + \sum_{t=0}^{T_u^r} r_{l_m}^{k,p}(t)_u,$$

wherein $T_d^r$ and $T_u^r$ are respectively numbers of downlink subframes and uplink subframes of the microcell in the next frame structure change cycle, $r_{l_m}^{k,p}(t)_d = e_d^r \cdot 0.001 \cdot F$, wherein, $e_d^r$ is an average spectral efficiency of a downlink transmission of subframes having the same transmission direction in the microcell and a macrocell to which the microcell belongs, F is a system bandwidth, $$r_{l_m}^{k,p}(t)_u = e_d^r \cdot 0.001 \cdot F \cdot \frac{I_u^r}{I_u^r + \sum_{i=0}^{M} OCI_d^{i,m}},$$

wherein $I_u^r$ is an average interference level of uplink transmission of the subframes having the same transmission direction in the microcell and a macrocell to which the microcell belongs, $OCI_d^{i,m}$ represents an interference of a downlink signal from the macrocell in the eNB whose serial number is i on uplink reception of the microcell.

6. The method of claim 5, wherein, $$m_l^{k,s} = \sum_{t=0}^{T_d^m} m_l^{k,s}(t)_d + \sum_{t=0}^{T_u^m} m_l^{k,s}(t)_u,$$

wherein $T_d^m$ and $T_u^m$ are respectively numbers of downlink subframes and uplink subframes of the macrocell in the next frame structure change cycle, $m_l^{k,s}(t)_d = e_d^m \cdot 0.001 \cdot F$, wherein, $e_d^m$ is an average spectral efficiency of the downlink transmission of the subframes having the same transmission direction in the macrocell and a subordinate microcell of the macrocell, $$m_l^{k,s}(t)_u = e_d^m \cdot 0.001 \cdot F \cdot \frac{I_u^m}{I_u^m + OCI_d^{k,r}},$$

wherein, $I_u^m$ is an average interference level of the uplink transmission of the subframes having the same transmission direction in the macrocell and the subordinate microcell of the macrocell, and $OCI_d^{i,r}$ represents an interference of a downlink signal from the microcell in the eNB whose serial number is i on uplink reception of the macrocell.

7. The method of claim 4, wherein when transmitting on the downlink of the macrocell and receiving on the uplink of the microcell, the method further comprises:
the macrocell sending data that are sent to a subordinate user equipment and a scheduling result of the user equipment to the microcell;
according to the data of the user equipment and the scheduling result, the microcell estimating a channel from the macrocell to the microcell and an interference of the macrocell on the microcell;
the microcell subtracting the interference of the macrocell from a received uplink signal.

8. The method of claim 4, wherein when receiving on the uplink of the macrocell and sending on the downlink of the microcell, the method further comprises:
the microcell sending the scheduling result of a subordinate user equipment to the macrocell;
the macrocell estimating a channel from the macrocell to the microcell and an interference of the microcell on the macrocell according to the scheduling result of the user equipment;
the macrocell subtracting the interference of the microcell from a received uplink signal.

9. The method of claim 8, wherein, $$r_{l_m}^{k,p} = \sum_{t=0}^{T_d^r} r_{l_m}^{k,p}(t)_d + \sum_{t=0}^{T_u^r} r_{l_m}^{k,p}(t)_u,$$

wherein $T_d^r$ and $T_u^r$ are respectively the numbers of downlink subframes and uplink subframes of the microcell in the next frame structure change cycle, $r_{l_m}^{k,p}(t)_d = e_d^r \cdot 0.001 \cdot F$, wherein, $e_d^r$ is the average spectral efficiency of the downlink transmission of the subframes having the same transmission direction in the microcell and a macrocell to which the microcell belongs, F is the system bandwidth, and $$r_{l_m}^{k,p}(t)_u = e_d^r \cdot 0.001 \cdot F \cdot \frac{I_u^r}{I_u^r + \sum_{\substack{i=0 \\ i \neq k}}^{M} OCI_d^{i,m}},$$

wherein, $I_u^r$ is the average interference level of the uplink transmission of the subframes having the same transmission direction in the microcell and a macrocell to which the microcell belongs, $OCI_d^{i,m}$ represents the interference of a downlink signal from the macrocell in the eNB whose serial number is i on the uplink reception of the microcell.

10. The method of claim 8, wherein:

$$m_l^{k,s} = \sum_{t=0}^{T_d^m} m_l^{k,s}(t)_d + \sum_{t=0}^{T_u^m} m_l^{k,s}(t)_u,$$

wherein $T_d^m$ and $T_u^m$ are respectively the numbers of downlink subframes and uplink subframes of the macrocell in the next frame structure change cycle, $m_l^{k,s}(t)_d = e_d^m \cdot 0.001 \cdot F$, wherein, $e_d^m$ is the average spectral efficiency of the downlink transmission of the subframes having the same transmission direction in the macrocell and a subordinate microcell of the macrocell, and $m_l^{k,s}(t)_u = e_d^m \cdot 0.001 \cdot F$.

11. An apparatus for canceling interference, suitable for a plurality of adjacent evolved NodeBs (eNBs) with which a cooperative group is composed, comprising: a frame structure configuration information transceiving unit and a frame structure configuring unit, wherein:
each eNB comprises a macrocell and a microcell, the apparatus further comprises: a macrocell unit corresponding to the macrocell, and a microcell unit corresponding to the microcell;
the microcell unit notifies the macrocell unit of the microcell's frame structure, spectral efficiency, uplink interference level, and the macrocell unit determines a system capacity of the eNB according the frame structure, the spectral efficiency, and the uplink interference level;
the frame structure configuration information transceiving unit is configured to: send the system capacity to each evolved NodeB (eNB) other than a local eNB in a cooperative group every other frame structure change cycle, and receive the system capacity sent by the eNB in the cooperative group;
the frame structure configuring unit is configured to: configure a frame structure to be used in a next frame structure change cycle according to the system capacity received by the frame structure configuration information transceiving unit.

12. The apparatus of claim 11, wherein:
the frame structure configuration information transceiving unit is configured to, send the system capacity $C_0^k \sim C_{L-1}^k$ when applying each one of L candidate frame structures to each eNB other than the local eNB in the collaborative group every other frame structure change cycle, wherein, k is a serial number of the eNB in the collaborative group, and L is an integer larger than 1;
the frame structure configuring unit is configured to, after the frame structure configuration information transceiving unit receives the system capacity sent by each eNB other than the local eNB in the cooperative group, calculate a total cooperative capacity $C_l$ of each candidate frame structure, $$C_l = \sum_{k=0}^{K-1} C_l^k,$$

and configure a candidate frame structure corresponding to a maximum total cooperative capacity as the frame structure to be used in a next frame structure change cycle;
wherein l is a serial number of the candidate frame structure, and K is a number of the eNBs in the cooperative group.

13. The apparatus of claim 12, wherein:

$$C_l^k = \sum_{s=0}^{S} m_l^{k,s} + \sum_{p=0}^{P} r_{l_m}^{k,p},$$

wherein $m_l^{k,s}$ is a capacity when a macrocell s in the eNB whose serial number is k uses the frame structure l in the next frame structure change cycle, $r_{l_m}^{k,p}$ is a capacity when a microcell p in the eNB whose serial number is k uses a frame structure $l_m$ in the next frame structure change cycle, and the frame structure $l_m$ used by the microcell p is a frame structure different from the frame structure l and selected by the microcell according to performance of the microcell itself.

14. The apparatus of claim 13, wherein, $$r_{l_m}^{k,p} = \sum_{t=0}^{T_d^r} r_{l_m}^{k,p}(t)_d + \sum_{t=0}^{T_u^r} r_{l_m}^{k,p}(t)_u,$$

wherein $T_d^r$ and $T_u^r$ are respectively numbers of downlink subframes and uplink subframes of the microcell in the next frame structure change cycle, $r_{l_m}^{k,p}(t)_d = e_d^r \cdot 0.001 \cdot F$, wherein, $e_d^r$ is an average spectral efficiency of the downlink transmission of the subframes having the same transmission direction in the microcell and a macrocell to which the microcell belongs, F is a system bandwidth, $$r_{l_m}^{k,p}(t)_u = e_d^r \cdot 0.001 \cdot F \cdot \frac{I_u^r}{I_u^r + \sum_{\substack{i=0 \\ i \neq k}}^{M} OCI_d^{i,m}},$$

wherein, $I_u^r$ is an average interference level of the uplink transmission of the subframes having the same transmission direction in the microcell and a macrocell to which the microcell belongs, $OCI_d^{i,m}$ represents an interference of a downlink signal from the macrocell in the eNB whose serial number is i on uplink reception of the microcell;

$$m_l^{k,s} = \sum_{t=0}^{T_d^m} m_l^{k,s}(t)_d + \sum_{t=0}^{T_u^m} m_l^{k,s}(t)_u,$$

wherein $T_d^m$ and $T_u^m$ are respectively numbers of downlink subframes and uplink subframes of the macrocell in the next frame structure change cycle, $m_l^{k,s}(t)_d = e_d^m \cdot 0.001 \cdot F$, wherein, $e_d^m$ is an average spectral efficiency of the downlink transmission of the subframes having the same transmission direction in the macrocell and a subordinate microcell of the macrocell, $$m_l^{k,s}(t)_u = e_d^m \cdot 0.001 \cdot F \cdot \frac{I_u^m}{I_u^m + OCI_d^{k,r}},$$

wherein, $I_u^m$ is an average interference level of the uplink transmission of the subframes having the same transmission direction in the macrocell and a subordinate microcell of the macrocell, $OCI_d^{i,r}$ represents an interference of a downlink signal from the microcell in the eNB whose serial number is i on uplink reception of the macrocell.

15. The apparatus of claim 13, wherein:
the macrocell unit is further configured to, when transmitting on the downlink, send data which are sent to a subordinate user equipment and a scheduling result of the user equipment to the microcell unit;
the microcell unit is further configured to, when receiving on the uplink, according to the data of the user equipment and the scheduling result, estimate a channel from the macrocell unit to the microcell unit and an interference of the macrocell unit on the microcell unit, and subtract the interference of the macrocell unit from a received uplink signal.

16. The apparatus of claim 15, wherein, $$r_{l_m}^{k,p} = \sum_{t=0}^{T_d^r} r_{l_m}^{k,p}(t)_d + \sum_{t=0}^{T_u^r} r_{l_m}^{k,p}(t)_u,$$

wherein $T_d^r$ and $T_u^r$ are respectively the numbers of downlink subframes and uplink subframes of the microcell in the next frame structure change cycle, $r_{l_m}^{k,p}(t)_d = e_d^r \cdot 0.001 \cdot F$, wherein, $e_d^r$ is the average spectral efficiency of the downlink transmission of the subframes having the same transmission direction in the microcell and a macrocell to which the microcell belongs, F is the system bandwidth, $$r_{l_m}^{k,p}(t)_u = e_d^r \cdot 0.001 \cdot F \cdot \frac{I_u^r}{I_u^r + \sum_{\substack{i=0 \\ i \neq k}}^{M} OCI_d^{i,m}},$$

wherein, $I_u^r$ is the average interference level of the uplink transmission of the subframes having the same transmission direction in the microcell and a macrocell to which the microcell belongs, $OCI_d^{i,m}$ represents the interference of a downlink signal from the macrocell in the eNB whose serial number is i on the uplink reception of the microcell;

$$m_l^{k,s} = \sum_{t=0}^{T_d^m} m_l^{k,s}(t)_d + \sum_{t=0}^{T_u^m} m_l^{k,s}(t)_u,$$

wherein $T_d^m$ and $T_u^m$ are respectively the numbers of downlink subframes and uplink subframes of the macrocell in the next frame structure change cycle, $m_l^{k,s}(t)_d = e_d^m \cdot 0.001 \cdot F$, wherein, $e_d^m$ is the average spectral efficiency of the downlink transmission of the subframes having the same transmission direction in the macrocell and a subordinate microcell of the macrocell, $m_l^{k,s}(t)_u = e_d^m \cdot 0.001 \cdot F$.

17. The apparatus of claim 13, wherein,
the microcell unit is further configured to, when transmitting on the downlink, send the scheduling result of a subordinate user equipment to the macrocell unit;
the macrocell unit is further configured to, estimate a channel from the macrocell unit to the microcell unit and an interference of the microcell unit on the macrocell unit according to the scheduling result of the user equipment, and subtract the interference of the microcell unit from a received uplink signal.

* * * * *